UNITED STATES PATENT OFFICE

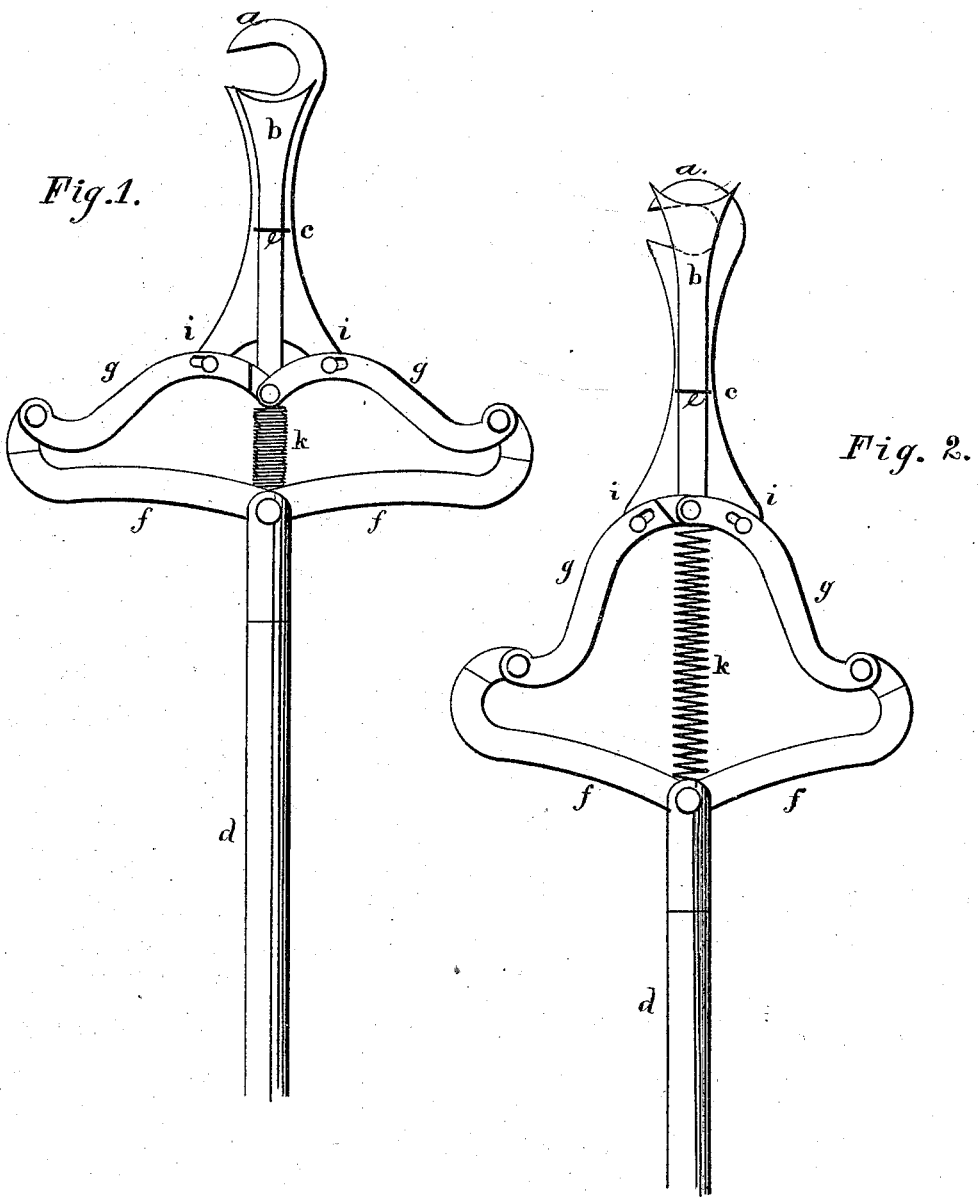

ALEXANDER P. BETTERSWORTH, OF CARLINVILLE, ILLINOIS.

IMPROVEMENT IN PRUNING IMPLEMENTS.

Specification forming part of Letters Patent No. 143,659, dated October 14, 1873; application filed June 23, 1873.

*To all whom it may concern:*

Be it known that I, ALEXANDER P. BETTERSWORTH, of Carlinville, Macoupin county, State of Illinois, have invented a Pruning-Hook, of which the following is a specification:

My invention relates to the class of pruning-hooks in which a hook and sliding knife are so arranged that their cutting-edges are made to approach each other by means of toggle or jointed levers, said effect being produced by a direct pulling or tractive force applied to the handle of the implement.

My object is to increase the efficiency of such devices; and to that end it consists in the arrangement of double levers and a spiral spring, in connection with a cutting-hook and a chisel-cutter, adapted to slide on each other, said levers serving, by their extension, to operate the cutting devices, and the spring to retract and hold the same close together for renewing the cutting operation, as hereinafter described.

In the drawing the double levers $f\,f$ are represented as pivoted at their inner ends to the staff or handle $d$, and to the levers $g\,g$ at their outer ends. The latter are pivoted together at their inner ends, and also to the shank of the sliding cutter $b$. The spiral spring $k$ connects the shank of the hook and the vertically opposite pivots of the levers $f\,f$.

The levers $g\,g$ are connected with the shank $c$ of the hook $a$ by means of headed pins $i\,i$ working in short slots. The opposite edges of the hook and cutter $b$ are suitably beveled, and the latter slides on the former through a guide, $e$, as shown.

To operate the implement the hook $a$ is placed over the branch or limb to be severed, when the force applied to the shaft or handle $d$ forces downward said hook-knife $a$ by the combined action of the four levers $f\,f$ and $g\,g$, while the two slotted upper levers $g\,g$ force the knife $b$ upward, as in Fig. 2, thus moving the cutting edges of $a$ and $b$ in opposite directions with ample force to sever any intervening twig or branch. The coil-spring $k$ is so attached as to readjust the levers $f\,f$ and $g\,g$ with the cutter $b$ after each and every stroke.

I claim as my invention—

1. The combination, with the handle $d$, of the double levers $f\,f$ and $g\,g$, the hook $a$ provided with shank $c$, having a fulcrum connection with the levers $g\,g$ at $i\,i$, and the sliding cutter $b$, all arranged as shown and described.

2. The combination of the spiral spring $k$, with the handle $d$, double levers $f\,g$, hook $a$, and sliding cutter $b$, as shown and described.

ALEXANDER P. BETTERSWORTH.

Witnesses:
JOHN T. ROGERS,
NICHOLAS DUBOIS.